United States Patent [19]

Marshall, Jr. et al.

[11] Patent Number: 5,587,011

[45] Date of Patent: Dec. 24, 1996

[54] OPTICALLY WHITENED CLAY PIGMENTS

[75] Inventors: Carl J. Marshall, Jr.; Gary M. Freeman, both of Macon, Ga.

[73] Assignee: J. M. Huber Corporation, Edison, N.J.

[21] Appl. No.: 419,069

[22] Filed: Apr. 6, 1995

Related U.S. Application Data

[63] Continuation-in-part of Ser. No. 382,938, Feb. 1, 1995, abandoned, which is a continuation of Ser. No. 102,312, Aug. 5, 1993, abandoned, which is a continuation of Ser. No. 844,318, Mar. 30, 1992, abandoned, which is a continuation of Ser. No. 665,824, Mar. 7, 1991, abandoned, which is a division of Ser. No. 427,341, Oct. 27, 1989, abandoned.

[51] Int. Cl.$^6$ .................................................. C04B 14/00
[52] U.S. Cl. ..................... 106/416; 106/402; 106/413; 106/445; 106/447; 106/460; 106/465; 106/471; 106/479; 106/486; 106/487; 106/490; 106/491; 106/499; 106/285; 162/181.1; 162/181.6; 162/181.8; 523/500; 523/513; 523/521; 524/445; 524/447
[58] Field of Search ..................................... 106/402, 413, 106/416, 445, 447, 460, 465, 471, 479, 486, 487, 490, 491, 499, 285; 162/181.1, 181.6, 181.8; 523/500, 513, 521; 524/445, 447

[56] References Cited

U.S. PATENT DOCUMENTS

| | | | |
|---|---|---|---|
| 3,545,909 | 12/1970 | Gagliardi | 8/523 |
| 3,834,924 | 9/1974 | Grillo | 106/490 |
| 3,880,666 | 4/1975 | Remer | 106/479 |
| 3,897,333 | 7/1975 | Field et al. | 210/734 |
| 3,950,180 | 4/1976 | Kato | 106/468 |
| 4,017,325 | 4/1977 | Remer | 106/486 |
| 4,084,983 | 7/1978 | Bernhard et al. | 106/402 |
| 4,492,686 | 1/1985 | Guillon et al. | 424/DIG. 5 |
| 4,543,128 | 9/1985 | Troesch et al. | 106/23 |
| 4,566,908 | 1/1986 | Nakatani et al. | 106/490 |
| 4,605,612 | 8/1986 | Asao et al. | 430/538 |
| 4,661,164 | 4/1987 | Severinghaus, Jr. | 106/414 |
| 4,773,936 | 9/1988 | Clark et al. | 106/402 |
| 4,877,451 | 10/1989 | Winnick et al. | 106/490 |
| 5,131,910 | 7/1992 | Breault | 8/400 |

OTHER PUBLICATIONS

Kirk–Othmer Encyclopedia of Chemical Technology, 3rd Ed., vol. 10, pp. 500–506 and 520 "Flocculants" entry, 1982 no month available.

Encyclopedia of Polymer Science & Engineering, 2nd Ed., vol. 11, pp. 489–507, "Polyamines and Polyquaternary Ammonium Salts" Entry, Wiley and Sons, 1970 no month available.

McGraw Hill Encyclopedia of Science & Technology, 1066, vol. 10, pp. 223–224 (Pigments); vol. 4, pp. 297–298 (dyes), p. 307 (fluorescent brightness), 1987 no month available.

CAS 82(24):157176c, Abstract of DE 2,333,927, "Polyamide Mannich Bases as Flocking Agents", Jan., 1975.

*Primary Examiner*—Mark L. Bell
*Assistant Examiner*—Scott L. Heatzog
*Attorney, Agent, or Firm*—Lowe, Price, LeBlanc & Becker

[57] ABSTRACT

This invention involves a method of optically whitening clay minerals to transform their natural yellow tint to increased whiteness. Generally, it has been found that clay materials having low cation exchange capability can be directly reacted with very small amounts of cationic dyes, the apparent whiteness of said clay minerals being substantially increased thereby.

33 Claims, 5 Drawing Sheets

Comparison of Blue ER, Blue GLK, and Red 2B on Hydragloss Clay

Brightness values relative to untreated control clay

Comparison of Blue ER, Blue GLK, and Red 2B on Hydragloss Clay

OPTICALLY WHITENED CLAY PIGMENTS

This application is a continuation-in-part application of Ser. No. 08/382,938, filed Feb. 1, 1995, abandoned, which is a continuation of Ser. No. 08/102,312, filed Aug. 5, 1993, abandoned, which is a continuation of Ser. No. 07/844,318, filed Mar. 30, 1992, abandoned, which is a continuation of Ser. No. 07/665,824, filed Mar. 7, 1991, abandoned, which in turn is a divisional of Ser. No. 07/427,341, filed Oct. 27, 1989 now abandoned.

TECHNICAL FIELD

This invention relates to water-soluble cationic, organic dyes which have been placed onto the surface of clay mineral pigment substrates thereby to form optically whitened pigments. The mineral clay pigments are designed to replace presently used inorganic white pigments in many different applications including plastics, rubber, paint, printing inks, paper, and paper coatings.

BACKGROUND ART

Historically inorganic white pigments, such as hydrated or anhydrous siliceous minerals including metal silicates, sodium aluminosilicates, hydrated aluminum silicates, e.g., clays, have found increasing uses in many industries. For example, such pigments are employed in paper coating compositions, as fillers for paper, paints, inks, etc. In addition to being used as fillers, these inorganic pigments are often used as color-imparting fillers in papers, paints, inks, etc., and as color-imparting reinforcing pigments or fillers in elastomers and other polymeric materials.

In the process of dyeing inorganic pigments, it is important to fix or chemically attach dyes onto the pigment particles. In this regard, it is usually necessary to treat pigment particles in a manner so as to improve the surface affinity of the pigment particles to the dyestuffs utilized.

Several methods of improving the surface affinity of various inorganic pigment particles to dyestuffs have been reported. U.S. Pat. No. 3,834,824 to Grillo, teaches a process for manufacturing surface modified inorganic pigments. The process according to this patent includes adding amino organosilanes to an aqueous dispersion of an inorganic pigment whereby the inorganic pigment is contacted with the amino organosilane and reacts so that the surface of the inorganic pigment is modified in a manner to increase its affinity for dyes.

U.S. Pat. No. 3,545,909 to Gagliardi, teaches aminoalkyl silicone coloring assistants that may be applied in the form of a pre-treatment to condition inorganic pigment substrates for a subsequent coloring operation. This pre-treatment with the aminoalkyl silicone coloring assistants induces dyeable sites onto normally non-affinitive materials so that they may accept conventional anionic type organic dyes.

U.S. Pat. No. 4,084,983 to Bernhard et al, teaches a process for producing colored lustrous pigments in which a firmly adhering coating of aluminum hydroxide is first applied to pigment substrates. The aluminum ions contained in the coating are then reacted to form a firmly adhering dyestuff layer. In this manner, the substrate is coated with a starting material which is convertible into a colored layer.

U.S. Pat. No. 4,543,128 to Troesche et al, teaches a process for dyeing inorganic pigments that can be used as fillers. According to this patent, pigments are dyed with polycationic dyestuffs in a process that involves providing a colored composition of an aqueous paste or dispersion of a white pigment with a water-soluble polycationic dye. Optionally, a conventional fixing agent or metallized cationic dye may be used in said process. Colored pigments are produced by the indicated treatment process, but this art does not teach the use of cationic dyes for the specific purpose of improving pigment whiteness.

U.S. Pat. No. 4,566,908 to Nakatani et al, teaches a process of producing an azoic pigment including a silica core with a coating of amino or polyazoic dye chemically bound to the surface of the silica core through an amino silane coupling agent.

U.S. patent applications Ser. Nos. 07/427,340 (now U.S. Pat. No. 5,106,421) and 07/427,342, filed on Oct. 27, 1989, teach mineral based materials, such as kaolin, that have been colored with a variety of dyes. In general, these applications disclose that direct dyeing is not used. Materials identified as anionic chemical fixatives are used to insolubilize basic dyes onto the surface of the inorganic pigment and cationic chemical fixatives are used to insolubilize acid or direct dyes. Various resinous polymers, methylolamide polymers and/or quaternary ammonium polymers are useful as cationic fixatives, while resorcinol formaldehyde resins, polyacrylates and related materials can function as anionic chemical fixatives. These applications furnish considerable detail concerning the dyed pigments and the preparation thereof.

U.S. Pat. No. 3,950,180 to Kato does teach the direct introduction of basic water-soluble dyestuffs onto zeolites and montmorillonite. Such materials have fairly large cation exchange capacities in the range of 60 to 400 meq. per 100gm of material. These materials must be pretreated with acids and/or bases, or so treated during the dyeing process to give the surface the desired cation exchange capacities. In the specification of the patent, column 1, lines 9–28, it is stated that:

> "In general, clay minerals are used as fillers for extenders or lake pigments. Many of such clay minerals consist of mainly kaolinite, talc or pyrophyllite and are useful in making them inexpensive in cost. On the other hand, pigments manufactured by making organic dyestuffs adsorbed on said clay minerals are also used. In these pigments, however, the organic dyestuffs are adsorbed only on the surface of these clay minerals, the adsorbed quantity thereof being less than 1%. Namely, these clay minerals possess no cation between the crystal layers or in the three dimensional network structure thereof, consequently color development in these clay minerals is due to a mere physical adsorption of the dyestuffs on the surface thereof. The cation exchange capacity of these clay minerals is caused by silanol radicals existing at the ends or fractures of the crystals, and is only 5–10 meq per 100g. Therefore, these pigments have a weak coloring power and a thermal resistance lower than that of the dyestuffs adsorbed and consequently are limited in uses."

The clear teaching of the reference is that direct dyeing of clays, such as kaolin, would not be expected to lead to commercially useful colored products.

Kato also teaches that the amount of basic dyestuff needed is 0.01 to 50 wt. % of dried inorganic material. The implication of the patent is that unless the zeolite or treated montmorillonite can react with at least that amount of basic dye, an unsatisfactory, weakly dyed unstable pigment will be obtained.

What the prior art does not recognize is that the inability of an inorganic pigment, such as kaolin, to be strongly dyed because of its very low cation exchange capacity can, in fact, be advantageous. It can be utilized to react said inorganic pigments with very small amounts of basic dye, the resulting weakly dyed materials having considerable utility.

U.S. Pat. No. 4,661,164 to Severinghaus reveals that the optical whiteness properties of various mineral fillers, like clay or limestone, can be improved by a tinting strategy that involves adding "non-bonding" blue pigments which are intimately intermixed therein. The blue, water insoluble pigment of choice in Severinghaus' process is Ultramarine Blue. This tinting process strictly relies on producing an intimate physical mixture of pigments rather than bonding water-soluble dyes to the surface of an inorganic pigment. Hence this prior art suffers from several disadvantages, including: 1) loss of final pigment brightness; 2) absence of means for neutralizing the greenish-white tint that is produced; 3) possibility of tinting pigment separating from mineral; and 4) optical tinting inefficiencies relative to dyes (see Example 5).

DISCLOSURE OF THE INVENTION

It is an object of the present invention to provide a method of improving the optical whiteness properties of clay minerals, such as kaolin clays, through their surface modification with a select combination of blue and red cationic dyes. Kaolin clays, coming from naturally occurring deposits, are often contaminated with traces of interstitial $Fe^{+3}$ and with surface iron oxides that give the mineral a perceptible yellowish tint. Through the use of conventional clay processing techniques, this yellowish tint can be diminished but not entirely eliminated. Generally, a clay product of highest possible whiteness is desirable for end use in applications where color is important (such as paper, paint, plastics, etc.). Our invention relates to the co-use of blue and red cationic dyes in sufficient amounts to transform the clay's natural yellowish tint into increased optical whiteness without sacrificing pigment brightness.

Cationic dyes, also known as basic dyes, are water soluble organic dyestuffs having one or more positively charged functional groups. Typically, their positive charge is localized on N, S or O containing functional groups. Because of their positive charge, cationic dyes are capable of ionic bonding to the surface of kaolin clays via a cationic exchange mechanism. Cationic dyes have historically found most of their utility in the dyeing of textiles (like acrylics). All blue cationic dyes are useful in improving the optical whiteness properties of clay minerals; however, the blue and red cationic dyes particularly useful as dual treatments for clay are those blue cationic dyes that are "bright blue" or "reddish-blue" in hue and those red cationic dyes that are "bluish-red" in hue. Such color selections allow one to minimize the amount of red cationic dye needed for neutralizing the greenish tint that results from treating a yellowish clay substrate with a blue cationic dye. This is very important to maintaining brightness while improving whiteness levels.

Figure 1:
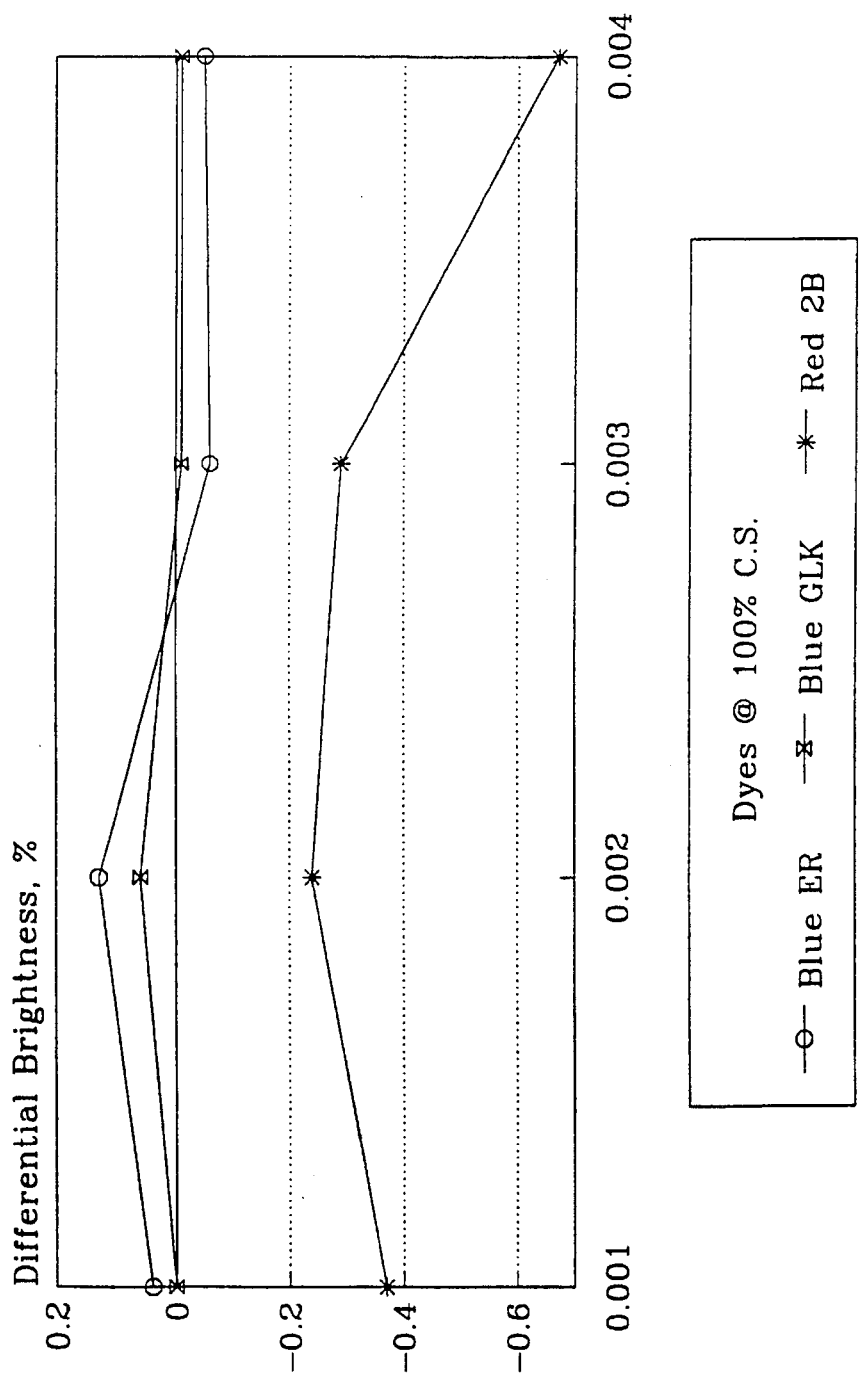
FIG. 1 graphically compares the differential brightness of Hydragloss™ Clay separately treated with each of the dyes Blue ER, Blue GLK and Red 2B as a percent of brightness values of untreated control clay.

The present invention involves the use of select cationic dyes for improving the optical whiteness of clay minerals like kaolin clays. A partial listing of useful blue cationic dyes in terms of their Colour Index identification numbers is tabulated below. The blue dyes that are highly preferred are those that are "bright blue" or "reddish-blue" in hue.

| Blue Cationic Dyes | | | |
|---|---|---|---|
| C.I. NUMBER | TRADENAME OF DYE | DYE COLOR* | CHEMICAL FAMILY |
| Basic Blue 77 | Sevron Blue ER | Bright Blue | Triarylmethane |
| Basic Blue 54 | Sevron Blue GLK | Bright Blue | Monoazo |
| Basic Blue 41 | Sevron Blue RL | Bright Blue | Monoazo |
| Basic Blue 3 | Sevron Blue 5GMF | Greenish Blue | Oxazine |
| Basic Blue 22 | Sevron Blue 2G | Bright Blue | Anthraquinone |
| Basic Blue 21 | Sevron Blue B | Reddish Blue | Anthraquinone |
| Basic Blue 9 | Methylene Blue | Greenish Blue | Thiazine |
| Basic Blue 26 | Victoria Blue B | Bright Blue | Triarylmethane |

*Note:
Dye Color refers to visual hue.

The preferred embodiment of this invention includes the use of select blue and red cationic dye combinations for producing clays of enhanced whiteness without sacrificing brightness. For definitional purposes, a drop in TAPPI % brightness of less than 0.3 point is considered insignificant and within the range of normal measurement variation. In most cases, blue cationic dyes when used alone will yield a higher whiteness clay product having a slight greenish tint. Applicants' feedback has indicated that a greenish-white tint is frequently objectionable to our potential customers in the paper and coatings industries. It is thus desirable to use small amounts of red cationic dye to neutralize this greenish tint while preserving the overall whiteness and brightness properties. Typical ratios of blue to red cationic dye range from 99/1 to 60/40 as based on both dyes at 100% color strength, but more preferably range from 96/4 to 70/30. Some particularly useful red cationic dyes include the following:

| Red Cationic Dyes | | | |
|---|---|---|---|
| C.I. NUMBER | TRADENAME OF DYE | DYE COLOR* | CHEMICAL FAMILY |
| Basic Violet 16 | Sevron Red 2B | Bluish Red | Methine |
| Basic Red 22 | Sevron Red CBL | Bluish Red | Azo |
| Basic Red 46 | Sevron Red GRL | Bluish Red | Monoazo |
| Basic Red 15 | Sevron Red B | Bluish Red | Methine |
| Basic Red 73 | Sevron Red YCN | Yellowish Red | Monoazo |

*Note:
Dye Color refers to visual hue.

The use of a blue/red dye treatment combination becomes all the more important as kaolin clay products of low brightness, and accordingly low original whiteness index, are treated for optical whiteness improvement. The lower the original whiteness index of a given clay the more yellowish it is in color such that adding a blue cationic dye alone yields a whiteness improvement with ever higher degrees of greenish tint. This situation thereby demands that starting clays of high yellowness index will require increased amounts of red cationic dye relative to blue dye to be used to help offset the greenish tint produced by the dye treatment employed to increase the clays' whiteness index. Accordingly, a high brightness #1 clay, like Hydragloss™ 90 (having original whiteness and yellowness index values of about 82 and 2.7, respectively), will normally require the use of a 95/5 or maybe 90/10 weight ratio treatment blend of Blue ER/Red 2B dyes for enhancing the clay's whiteness index. In contrast, a medium brightness #2 clay, like Hydrasperse™ (having original whiteness and yellowness index values of about 67 and 6.5, respectively), will often require the use of a Blue ER/Red 2B treatment combination at a weight ratio as high as 70/30.

Although adjusting the blue/red dye treatment ratio in accordance with the yellowness index of the starting kaolin clay seems fairly straightforward, eliminating the greenish tint while maintaining final pigment brightness is more difficult. This difficulty arises because the red cationic dyes (even those that are bluish-red) have a far more detrimental effect on the clay's brightness properties at low additive concentrations than do the blue cationic dyes. However, select red cationic dyes (like Red 2B) do help significantly to improve whiteness index properties. The use of blue/red dye treatment blends must therefore be restricted to a finite amount of red dye content to maintain our pigment brightness while simultaneously improving the whiteness index minus the generation of any greenish-white tint. Test data have shown that treatment blends having red cationic dye contents greater than 40% (i.e., a 60/40 ratio of blue/red dyes) should not be utilized if product brightness is to be maintained (particularly at dye treatment levels ≧ 0.0030% as based on 100% color strengths). For most clays, the ideal treatment ratio of blue/red cationic dyes ranges from 96/4 to 70/30.

As already discussed, it is desirable to minimize the amount of red cationic dye used in combination with blue cationic dye to maintain pigment brightness. The best way this can be accomplished is through a more select use of only certain blue and red cationic dyes that work cooperatively with one another. In particular, we have determined that it is highly preferred to utilize blue cationic dyes that are either "bright blue" or "reddish-blue" in hue since they will ultimately require reduced amounts of added red dye. Similarly we have determined that red cationic dyes that are "bluish-red" in hue are highly preferred for use in our blue/red treatment blends, because they still assist in clay whiteness improvement while also neutralizing any greenish tint.

The combined addition level of blue/red cationic dyes needed for improving the optical whiteness of kaolin clays without causing significant detriment to brightness generally ranges from 0.0001 to 0.05% by weight of clay (as based on dyestuffs of 100% color strength) but more typically ranges from 0.0005 to 0.02%. For an 80/20 Blue ER/Red 2B dye combination, these target dye amounts translate to active treatment level ranges of 0.00002 to 0.008% by weight of dry clay, but more typically from 0.00008 to 0.003%. Higher addition levels of blue/red dyes can of course be used for improving optical whiteness further, but improvement comes at the expense of brightness. It is also highly preferred that one employ cationic dyes of good UV and heat stability when said treated clay products are used as components of manufactured goods, such as paper, paint, plastics, etc. These embodiments, as well as others, are illustrated in the examples.

Clay minerals of enhanced whiteness are best prepared by being treated as aqueous slurries of 10 to 75% solids with the blue/red cationic dyes of choice. It is preferable that the aqueous clay slurry be well dispersed and at a pH of 6.0 to 10. Under low pH conditions, clay slurries are highly flocculated and their cation exchange reaction with a cationic dye can be inhibited because of the high hydrogen ion concentration. Kaolin clays also have a less negative surface charge at low pH's. A particularly convenient source of clay slurry for dye treatment is dispersed filter cake slurry (typically 50–58% solids) of pH 7. The cationic dyes are best employed as dilute solutions of 0.5 to 10.0% color strength which are then slowly added to the ambient clay slurry with vigorous agitation. On a commercial scale, this can be easily accomplished by injecting the dilute dye solution into a clay slurry stream on a continuous basis by means of a metering pump system and in-line mixer. Dye addition levels can be varied depending on the degree of whiteness enhancement desired, but normally fall into the range of 0.0005 to 0.02% (based on dyestuff of 100% color strength). The cation exchange reaction between clay and cationic dye is sufficiently fast that the treated clay slurry can be immediately spray dried if desired. Spray-dried, treated clays can also be used to build additional slurry solids, via a Cowles makedown process, so as to ship finished slurry products of 70% solids. The treated clay imparts enhanced whiteness properties whether it is utilized in applications requiring dry or slurried pigment.

EXAMPLES

Example 1

In this example, Hydragloss™ clay (a fine particle size East Georgia kaolin) was treated as a dispersed filter cake slurry of pH 7 with a variety of cationic blue dyes to reduce its inherent yellowish tint characteristics. Using a dye treatment level of 0.003% (as based on dyestuff at 100% color strength), we found that all were effective in increasing clay whiteness, but do so to varying degrees (see Table 1). As discussed later, cationic blue dyes of different hue will produce treated products of different whiteness (such as bluish-white, reddish-white, greenish-white, etc.). The selection of the best blue dye for a given starting clay often comes down to considerations of best UV stability, heat stability and desired final tint.

Example 2

In this example, Hydragloss™ 90 clay (a high brightness, fine particle size East Georgia kaolin) was treated with Sevron Fast Blue GLK (Basic Blue 54) over a wide treatment level range. The data of Table 2 indicate that a treatment level as low as 0.00125%, based on dyestuff at 100% color strength, still provides a whiteness enhancement of 2.5 points over the clay control. This low treatment level equates to an active dye concentration of 0.00021% by weight since, according to the manufacturer, Blue GLK at 100% color strength is only 16.9% active. Further, large improvements in clay whiteness without significant sacrifices in brightness can be realized as the dye treatment level is increased up to 0.015% (0.0025% on an active basis). (Note: A 0.30 point decrease in clay brightness is considered significant). Above the 0.015% treatment level, the Hydragloss™ 90 whiteness is still increased but at the expense of some brightness.

Beyond these whiteness considerations, a further point of interest concerns a slight improvement in clay pigment brightness over a select treatment level range (0.00125 to 0.0075% in this example).

Example 3

In this example, blue and red cationic dyes were combined in specific ratios and used as the surface tinting agent. Hydrasperse™ 90 clay (a Middle Georgia high brightness, #2 kaolin) was treated with these blue/red dye combinations. The data of Table 3 indicate significant improvement in clay whiteness without losing brightness. Because of the natural yellow tint of kaolin clays, the addition of a blue dye alone generally produces a slight color shift towards green (as indicated by a shift on the Hunter "a" scale towards more negative values). It is often desirable to enhance clay whiteness without producing a perceptible greenish tint. This can be accomplished by using blue cationic dyes that are either "bright blue" or "reddish-blue" in hue, as well as select blue/red dye combinations. In Table 3, one will note that Sevron Blue GLK produces a less negative "Delta A" value than Sevron Blue ER, which translates to a less perceptible greenish tint. In addition, red cationic dyes can be selectively combined with either Blue GLK or Blue ER to produce high whiteness clays having a "Delta A" value of almost 0. The co-addition of red dye helps to neutralize the greenish tint while maintaining a very high whiteness level.

Example 4

In this example, various kaolin clay products were treated with 0.005% Blue GLK dye, based on dyestuff at 100% color strength. This treatment level equates to an active dye concentration of 0.00085% by weight (see Example 2 for explanation). The data of Table 4 show that significant whiteness improvements were obtained for each product. This fact indicates that different clays respond to our whitening process including those of tertiary or cretaceous origin, #1 or #2 clays, coarse particle size or delaminated clays, as well as synthetic sodium aluminosilicates like SAMS. In short, the whiteness properties of any synthetic metal silicate or clay mineral based filler having some cation exchange capacity (CEC) can be improved by its treatment with low additive levels of blue or blue/red cationic dyes.

Example 5

In this example, the properties of our dye-treated and untreated Hubert35 clays are compared head-to-head with values previously reported by Severinghaus (in U.S. Pat. No. 4,661,164) for a ground limestone pigment which had been tinted to a comparable level of whiteness improvement via the addition of Ultramarine Blue pigment. The Hubert™ 35 product (a coarse particle size, Middle Georgia Cretaceous kaolin clay) was chosen here for comparative purposes because it has particle size and whiteness properties similar to those of the calcium carbonate pigments used by Severinghaus. The Huber™ 35 data re-presented in Table 5 were taken from Example 4 above, wherein the clay was treated with a 0.005% addition of Blue GLK dye (as based on dyestuff at 100% color strength). The data of Table 5 indicate that both strategies were able to yield whiteness index improvements on the order of 10 points; however, the relative addition levels of blue pigment versus blue cationic dye needed to do this were quite different. Approximately 44 times more Ultramarine Blue pigment (by weight) was required than Blue GLK dye to yield about the same improvement in whiteness index. This very large advantage in optical whitening efficiency not only improves cost/performance, but may also explain why the cationic dyes have minimal detrimental impact on clay pigment brightness at the treatment levels employed. As reported in Table 4, the Huber™ 35 products had initial and final brightness values of 83.74% and 83.97%, respectively.

Example 6

In this example, the SAMS products of Example 4 "treated and untreated versions" were evaluated as pigments in a wet-end paper filler application. For this study, handsheets were prepared using a British handsheet mould and dried using optical drying rings. The handsheet parameters and test results are summarized in Table 6. The opacity and brightness data show that our dye treatment has no effect upon these sheet properties. However, substantial improvements in sheet whiteness are indicated with the treated SAMS product (approximately 2 points at both filler levels).

Example 7

In this experiment, Hydrafine™ 90W clay was treated with a blue/red cationic dye combination at two different treatment levels. Sevron Blue GLK and Sevron Red 2B were utilized as the component dyes at a blue/red ratio of 91/9. The whiteness enhanced clays were then evaluated as coating pigments in a typical paper coating formulation. Pigment properties as well as details of the paper coating study are summarized in Table 7. The coating results indicate that the treated clays provide substantial improvements in the whiteness of the coated paper versus the control clay. All other sheet properties, such as opacity, brightness and gloss, were left unchanged.

Example 8

Figure 2:
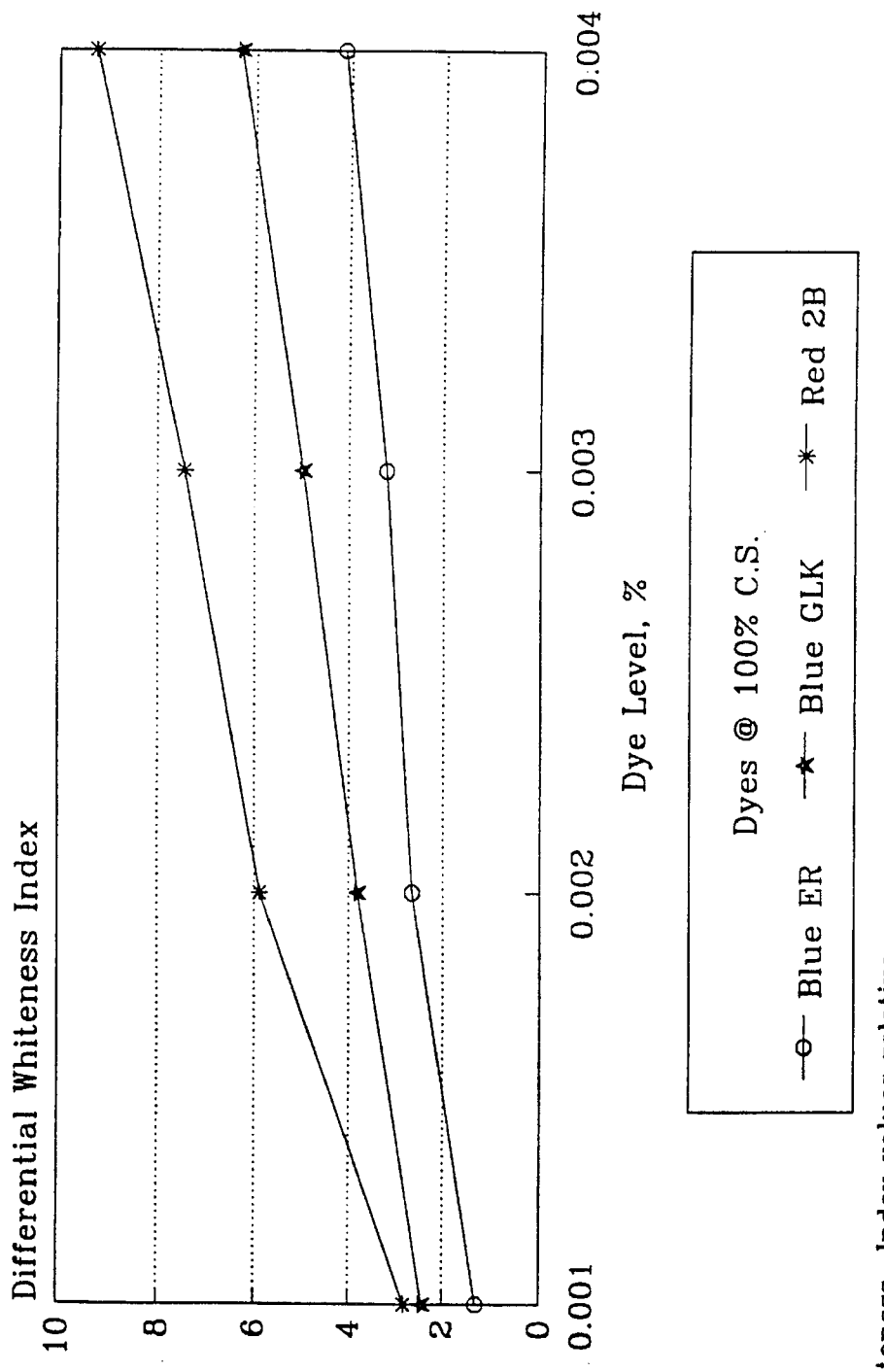
FIG. 2 graphically compares the differential whiteness index values of Hydragloss™ Clay separately treated with each of the dyes Blue ER, Blue GLK and Red 2B relative to the whiteness index values of untreated control clay.

In this example, Hydragloss™ clay was again treated as a filter cake slurry at a pH of 7 with various cationic dyes and subsequently spray-dried for comparative evaluation purposes. Various blue or red cationic dyes (including Blue ER, Blue GLK or Red 2B) were independently added as clay treatments over an addition level range of 0.0010% to 0.0040% by weight, based on dyestuffs at 100% color strength, to assess their relative effects on clay pigment brightness and whiteness. FIG. 1 shows the relative brightness trends, while FIG. 2 shows the relative whiteness index trends (with both figures being plotted as a function of dye treatment level and the optical values being shown as differential values against the untreated Hydragloss™ clay control). Although FIG. 2 shows that the Red 2B dye (which is bluish-red in hue) contributes significantly to improving the whiteness index of our clays, the Red 2B dye has a more detrimental effect on pigment brightness than the blue cationic dyes (see FIG. 1). These data thereby suggest that the use of blue/red dye treatment blends on kaolin clay should be restricted to a minimum amount of red cationic dye as needed to maintain our pigment brightness, while simultaneously improving the whiteness index properties minus the generation of any greenish-white tint. Said another way, one should add only enough red cationic dye to neutralize the greenish tint that results from modifying a yellowish clay with a blue cationic dye.

Example 9

Figure 3:
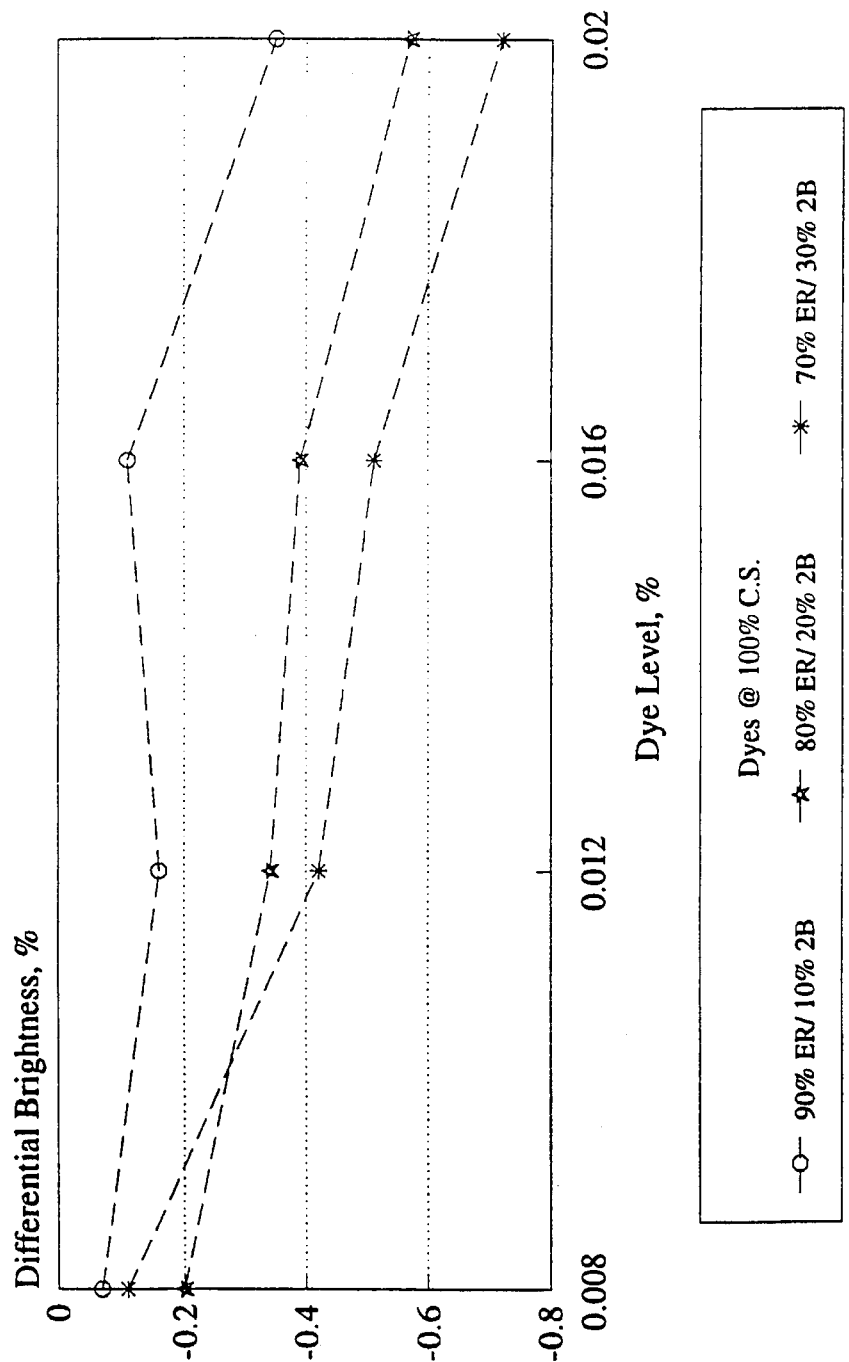
FIG. 3 graphically compares the differential brightness of Omnifil™ Clay separately treated with combinations of Blue ER and Red 2B in different ratios as a percent of brightness values of untreated control clay.
Figure 4:
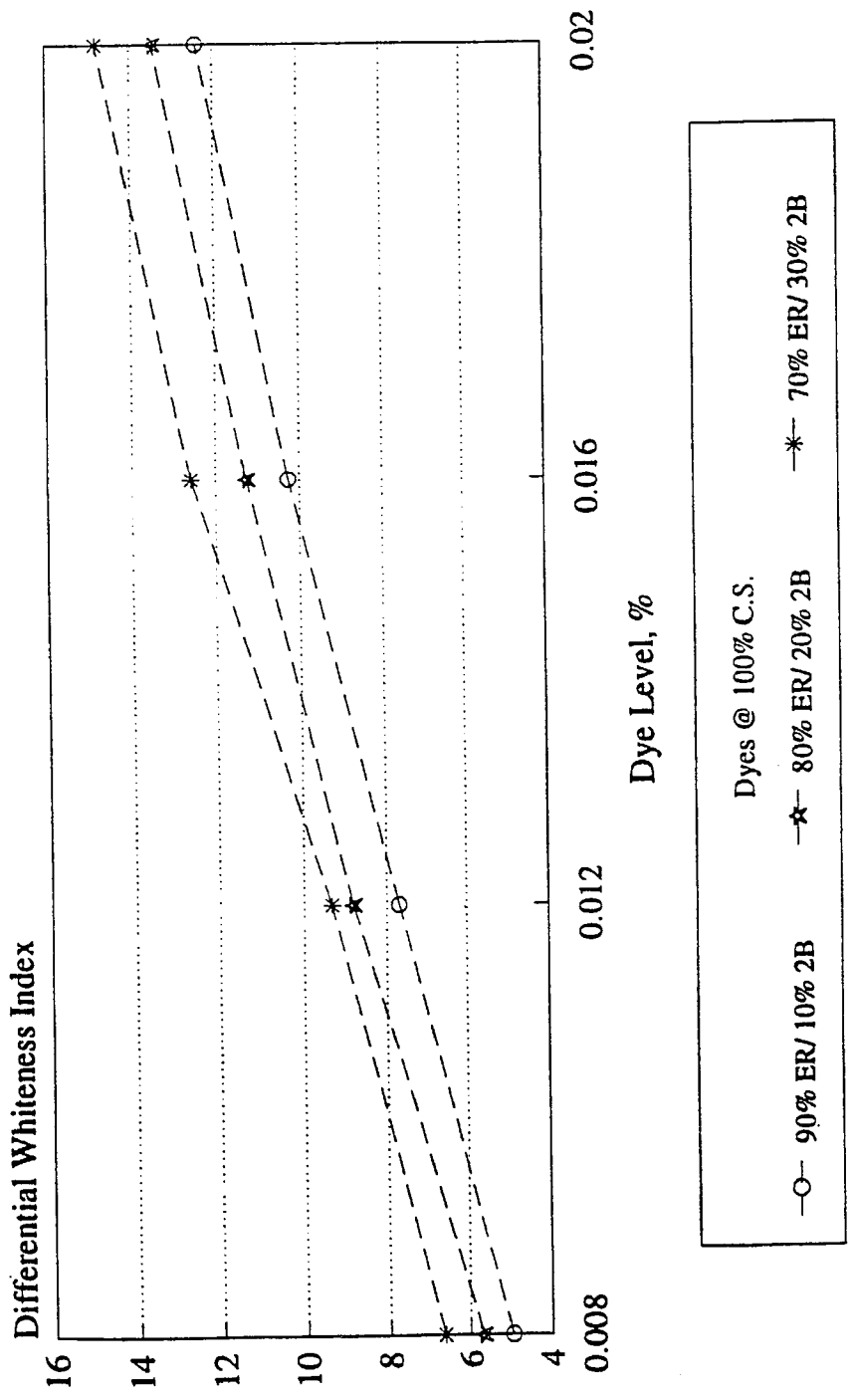
FIG. 4 graphically compares the differential whiteness index values of Omnifil™ Clay separately treated with combinations of Blue ER and Red 2B in different ratios relative to the whiteness index values of untreated control clay.

In this example, Omnifil™ clay (a low brightness, fine particle size East Georgia clay) was dye treated in slurry form at 68% solids and at a pH of 6.5. This clay was treated with various blend combinations of Blue ER/Red 2B cationic dyes over an addition level range of 0.008% to 0.020% by weight, based on dyestuffs at 100% color strength. The treated clay samples were subsequently spray-dried for comparative evaluation purposes. This test matrix was designed to show the relative effects of blue/red dye ratio, as a function of total dye treatment level, on clay brightness and whiteness properties. In contrast to the Hydrasperse™ 90 of Example 3, the use of Omnifil™ necessitates the exploration of higher dye ratios. Blue/red dye ratios of 90/10, 80/20 and 70/30 were thereby examined, respectively, wherein FIG. 3 shows the relative brightness trends, while FIG. 4 shows the relative whiteness index trends. The optical values in these two figures are shown as differential values against the untreated Omnifil™ clay control. In these figures, all blue/red dye ratios are found to contribute increasingly to improving the whiteness index properties as the total treatment level is increased; however, the treatment blends with higher red dye content clearly have a more detrimental effect on final brightness (particularly at high treatment levels). In analogy with Example 8, the data suggest that a minimum amount of red cationic dye should be used in combination with blue cationic dye to maintain pigment brightness values. However, the use of blue/red dye combinations becomes increasingly important as clay pigments of low initial brightness and accordingly low original whiteness index (like Omnifil™) are treated for optical whiteness improvement. The lower the original whiteness index of a given clay, the more yellowish it is in color such that adding a blue cationic dye alone yields a whiteness improvement with ever higher degrees of greenish tint. This situation therefore demands that starting clays of higher yellowness index will require increasing amounts of red cationic dye relative to blue cationic dye to help offset the resulting greenish tint produced by the treatment process. To improve pigment whiteness, to neutralize the greenish-white tint and simultaneously to maintain brightness properties for clays like Omnifil™ herein, defines the principal challenge for the chemist.

Example 10

Figure 5:
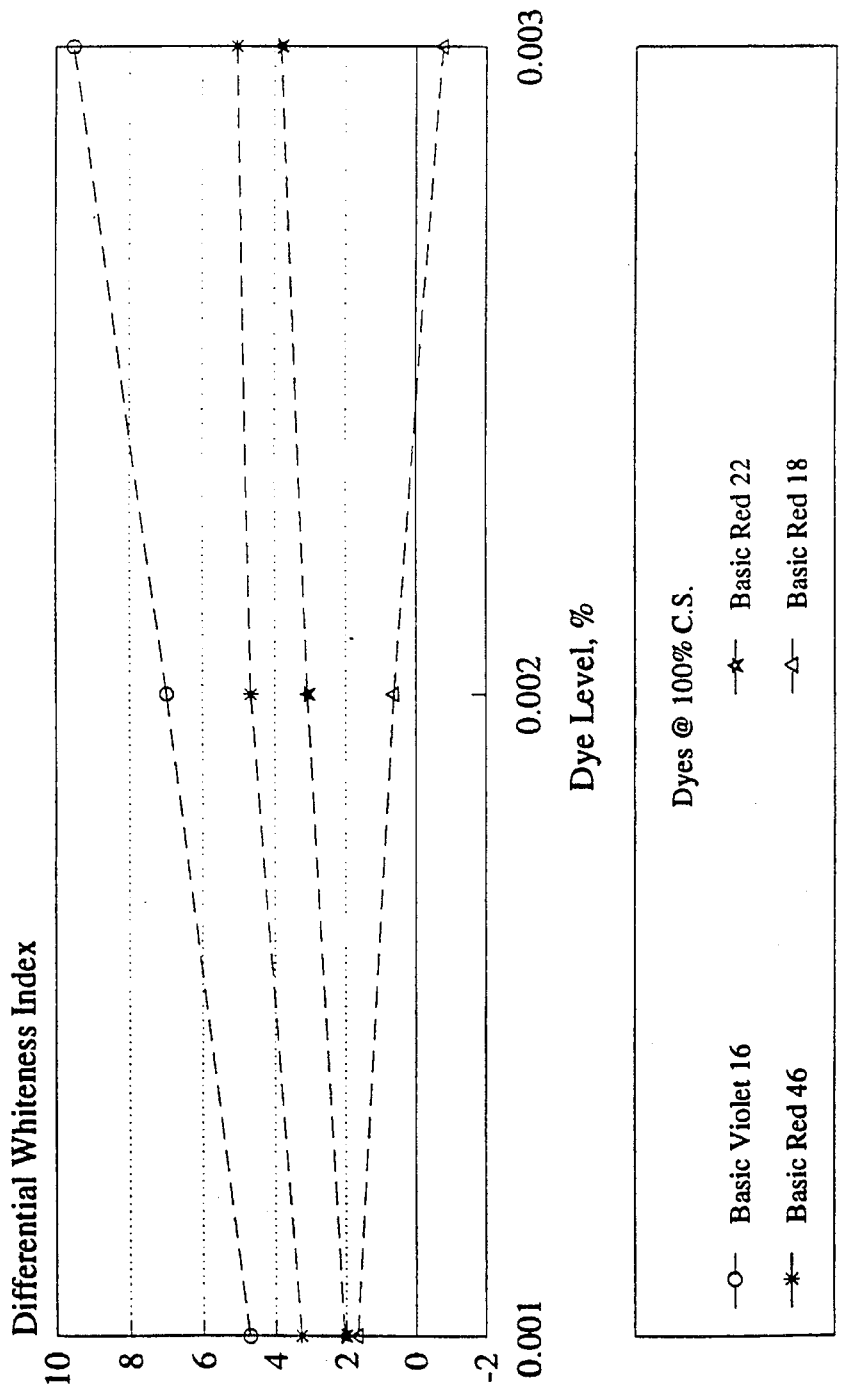
FIG. 5 graphically compares the differential whiteness index values of Hydrafine™ Clay separately treated with each of four red dyes relative to the whiteness index value of untreated control clay.

In this example, Hydrafine™ clay (a Middle Georiga medium brightness, #1 clay) was dye treated in filter cake slurry form with various red cationic dyes and subsequently spray-dried for comparative evaluation. Dye treatment levels ranged from 0.0010% to 0.0030% by weight, as based on dyestuff at 100% color strength. Red cationic dyes of different chemistry and hue were examined in this test matrix to assess their relative impact on pigment whiteness as a function of treatment level (see FIG. 5). The trends in whiteness index are shown as differential values against the untreated Hydrafine™ clay control. The data of FIG. 5 clearly show that significant performance differences are seen among the various red cationic dyes with respect to whiteness index improvement. Therefore, a red cationic dye should always be selectively chosen for co-use with our blue cationic dyes. In general, red cationic dyes that are Bluish-Red in hue are preferred. On the basis of clay pigment whiteness, Sevron Red 2B (i.e., Basic Violet 16) is a highly preferred red dye. The Red 2B dye works cooperatively with the blue cationic dyes of choice (namely Blue ER and Blue GLK), since it serves the dual purpose of significantly improving whiteness properties while also helping to neutralize any greenish tint.

TABLE 1

Various Cationic Blue Dyes on Hydragloss ™ Clay

| DYE*** | C.I. No.* | TL, %* | Br, %* | Wh* | Yel* |
| --- | --- | --- | --- | --- | --- |
| None (Clay Control) | — | — | 87.44 | 73.35 | 4.91 |
| Sevron Blue ER | Basic Blue 77 | 0.003 | 87.30 | 75.84 | 3.94 |
| Sevron Blue GBR | — | 0.003 | 87.37 | 77.25 | 3.47 |
| Sevron Blue BRL | Basic Blue 41 | 0.003 | 87.32 | 77.71 | 3.28 |
| Sevron Blue B | Basic Blue 21 | 0.003 | 87.34 | 74.08 | 4.58 |
| Sevron Fast Blue GLK | Basic Blue 54 | 0.003 | 87.36 | 77.46 | 3.41 |
| Methylene Blue 2B Conc. | Basic Blue 9 | 0.003** | 87.35 | 82.08 | 1.72 |

Note:
*C.I. No.—Colour Index Number
TL, %—Treatment Level (As based on dyestuff at 100% color strength)
Br—Brightness
Wh—Whiteness Index
Yel—Yellowness Index
Brightness and shade measurements were made using a Technibrite Micro TB-1C Instrument where:

TABLE 1-continued

Various Cationic Blue Dyes on Hydragloss ™ Clay

| DYE*** | C.I. No.* | TL, %* | Br, %* | Wh* | Yel* |
|---|---|---|---|---|---|

Brightness = % Reflectance @ 457 nm
Whiteness Index = 0.01 L (L-5.715 b)
Yellowness Index = 142.9 b/L
**TL, % on an as received basis (color strength unknown)
***Sevron is a trademark of the Crompton and Knowles Corporation, Reading, PA.

TABLE 2

Various Levels of Sevron Fast Blue GLK* on Hydragloss ™ 90 Clay

| GLK, % TL** | Br, % | Wh | Yel |
|---|---|---|---|
| None | 91.14 | 83.20 | 2.39 |
| 0.00125 | 91.30 | 85.73 | 1.54 |
| 0.00250 | 91.40 | 87.80 | 0.83 |
| 0.00375 | 91.38 | 89.92 | 0.26 |
| 0.00500 | 91.36 | 91.59 | −0.59 |
| 0.00750 | 91.27 | 94.13 | −1.57 |
| 0.01000 | 91.11 | 96.44 | −2.55 |
| 0.01250 | 90.96 | 98.85 | −3.57 |
| 0.01500 | 91.02 | 100.52 | −4.21 |
| 0.02000 | 90.72 | 103.68 | −5.62 |
| 0.02500 | 90.60 | 106.57 | −6.91 |
| 0.03750 | 90.18 | 112.39 | −9.71 |
| 0.05000 | 89.72 | 117.05 | −12.09 |

Note:
*Blue GLK = Basic Blue 54
**Treatment level as based on dyestuff at 100% color strength

TABLE 3

Effect of Blue/Red Dye Combinations on Hydrasperse ™ 90 Clay

| Dyes* | Ratio | TL, %** | Br, % | Wh | Yel | Delta a*** | Delta b*** |
|---|---|---|---|---|---|---|---|
| None | — | — | 89.45 | 77.39 | 3.94 | 0 | 0 |
| Blue GLK | — | 0.0030 | 89.50 | 82.51 | 2.13 | −0.28 | −1.22 |
| Blue ER | — | 0.0030 | 89.51 | 81.89 | 2.34 | −0.37 | −1.09 |
| None | — | — | 89.51 | 77.16 | 4.02 | 0 | 0 |
| Blue GLK | — | 0.0060 | 89.47 | 86.06 | 0.80 | −0.42 | −2.11 |
| Blue GLK/Red 2B | 96/4 | 0.0060 | 89.39 | 85.48 | 0.98 | −0.27 | −2.05 |
| Blue GLK/Red 2B | 91/9 | 0.0060 | 89.36 | 85.19 | 1.07 | 0.08 | −1.99 |
| Blue GLK/Red 2B | 85/15 | 0.0060 | 89.30 | 85.09 | 1.10 | 0.23 | −1.97 |
| None | — | — | 89.37 | 76.58 | 4.17 | 0 | 0 |
| Blue ER | — | 0.0045 | 89.39 | 83.14 | 1.86 | −0.45 | −1.41 |
| Blue ER/Red CBL | 95/5 | 0.0045 | 89.25 | 82.64 | 1.97 | −0.13 | −1.50 |
| Blue ER/Red CBL | 89/11 | 0.0045 | 89.14 | 82.60 | 1.96 | 0.04 | −1.50 |
| Blue ER/Red CBL | 82/18 | 0.0045 | 89.30 | 82.46 | 2.06 | 0.31 | −1.44 |

Note:
*Colour Index Nos. # for dyes are:
Sevron Fast Blue GLK = Basic Blue 54
Sevron Blue ER = Basic Blue 77
Sevron Brill. Red 2B = Basic Violet 16
Sevron Fast Red CBL = Basic Red 22
**Treatment Level as based on dyestuff at 100% color strength.
***Delta a and Delta b values calculated relative to the Hunter "a" and "b" values of clay control.

TABLE 4

Sevron Fast Blue GLK at 0.005% Treatment Level* on Various Clay-Based Products

| Product | | Br, % | Wh | Yel |
|---|---|---|---|---|
| Hydragloss ™90 | −U** | 90.69 | 81.72 | 2.76 |
| | −T** | 90.95 | 90.77 | −0.45 |

TABLE 4-continued

Sevron Fast Blue GLK at 0.005% Treatment Level* on Various Clay-Based Products

| Product | | Br, % | Wh | Yel |
|---|---|---|---|---|
| Hydrafine ™90W | −U | 89.63 | 78.44 | 3.50 |
| | −T | 89.50 | 86.59 | 0.50 |
| Hydrasperse ™ | −U | 85.87 | 66.90 | 6.51 |
| | −T | 85.84 | 75.08 | 3.59 |
| Hydraprint ™ | −U | 88.24 | 74.93 | 4.34 |
| | −T | 88.11 | 83.62 | 1.15 |
| Huber ™35 | −U | 83.74 | 64.38 | 6.83 |
| | −T | 83.97 | 75.12 | 2.98 |
| SAMS 5002*** | −U | 91.63 | 82.00 | 2.90 |
| | −T | 91.50 | 90.26 | −0.05 |

NOTE:
*Based on dyestuff at 100% color strength; Blue GLK = Basic Blue 54
** U—untreated   T—treated with dye
***SAMS - 5002 is a chemically structured clay pigment as described in U.S. Pat. Nos. 5,186,746 and 5,316,576.

TABLE 5

Comparative Whiteness Data for Different Technologies

| Mineral Filler | Additive or Treatment Agent | Additive Addt'n Level, Active Wt. % | Original Whiteness Index | Final Whiteness Index |
|---|---|---|---|---|
| Limestone* (3.5 µ) | Ultramarine Blue Pigment | 0.03750% (2.25 #/3 tons) | 67.9 | 77.0 |
| Huber ™35 Kaolin Clay (4.0 µ) | Sevron Blue GLK** | 0.00085% (0.005% TL @ 100% c.s.) | 64.4 | 75.1 |

Notes:
*Data taken directly from Example II per U.S. Pat. No. 4,661,164 of Severinghaus. Value in parenthesis is the pigment's median particle size.
**Blue GLK's active dye content at 100% color strength is 16.9% by weight.

TABLE 6

Evaluation of a Treated SAMS Pigment in a Paper Filler Application

Handsheet Parameters

| | |
|---|---|
| Pigments: | SAMS 5002 (control)* |
| | SAMS 5002 with 0.005% Blue GLK (per Table 4) |
| Filler Levels: | 6% and 12% |
| Furnish: | 60% AO-2 (Hardwood) & 40% International Pine |
| Freeness: | 350 csf |
| Basis Weight: | 40 #/ream |
| pH: | To 4.5 with Alum |
| Retention Aid: | 0.025% Betz 1260 |
| Machine Calendar: | 2 Nips (Weight of Steel Roll only) |
| Evaluate for: | Opacity, Brightness and Whiteness |

Results — Sheet Properties

| Pigment | Filler, % | Brightness, % | Opacity, % | Whiteness Index |
|---|---|---|---|---|
| SAMS 5002 | 6.0 | 85.1 | 79.8 | 67.5 |
| SAMS 5002 w/GLK | 6.0 | 85.3 | 80.1 | 69.5 |
| SAMS 5002 | 12.0 | 86.3 | 83.6 | 69.8 |
| SAMS 5002 w/GLK | 12.0 | 86.1 | 83.3 | 71.7 |

NOTE:
*SAMS-5002 is a chemically structured clay pigment as described in U.S. Pat. Nos. 5,186,746 and 5,316,576.

TABLE 7

Evaluation of a Treated Clay as a Paper Coating Pigment

Pigment Properties

| Clay Product* | Dye TL, %** | Blue/Red Ratio | Br, % | Wh | Yel |
|---|---|---|---|---|---|
| A) Hydrafine ™90W (Control) | — | — | 90.27 | 80.06 | 3.22 |
| B) Hydrafine ™90W w/GLK/2B | 0.0025 | 91/9 | 90.17 | 84.48 | 1.60 |
| C) Hydrafine ™90W w/GLK/2B | 0.0050 | 91/9 | 90.13 | 87.46 | 0.49 |

Paper Coating Formulation***

100 parts clay
12 parts latex (Dow 620)
4 parts Starch (Penford Gum 295)
0.5 parts Calcium Stearate

Coated Sheet Properties

| | HF-90W Pigments | | |
|---|---|---|---|
| Property | A | B | C |
| Brightness, % | 83.4 | 83.4 | 83.4 |
| Opacity, % | 86.1 | 85.9 | 85.9 |
| Gloss, % | 65.1 | 65.0 | 64.9 |
| Print Gloss, % | 78.4 | 78.6 | 78.9 |
| Whiteness Index | 77.0 | 78.7 | 80.5 |
| Yellowness Index | 2.8 | 2.1 | 1.4 |
| Parker Print Surf | | | |
| @ 10 Kgf | 1.54 | 1.50 | 1.55 |
| @ 20 Kgf | 1.21 | 1.14 | 1.19 |

Note:
*GLK = Sevron Fast Blue GLK (Basic Blue 54)
2B = Sevron Brill. Red 2B (Basic Violet 16)
**Treatment level as based on dyestuff at 100% color strength
***A coating of 64% color solids was applied at 8.0 #/Ream on United Paper Mills' 47 #/Ream Basestock using a "CLC" Coater.

The invention has been described herein with reference to certain preferred embodiments. However, as obvious variations thereon will become apparent to those skilled in the art, the invention is not to be considered as limited thereto.

We claim:

1. A method of optically whitening an inorganic pigment selected from a mineral clay pigment and a sodium aluminosilicate pigment, each pigment having a yellow tint, without sacrificing the pigment's brightness, comprising adding to an aqueous slurry of the pigment, an aqueous solution in combination comprising (1) a blue cationic organic dye that is either bright blue or reddish-blue in hue with (2) a red cationic organic dye that is bluish-red in hue, the ratio of the (1) blue to the (2) red dye being from 99/1 to 60/40 at an effective combined concentration of 0.00002 to 0.008% by weight as based on active dyestuffs on dry pigment, and vigorously mixing the resulting slurry to bond the dyes directly to the pigment, whereby the pigment exhibits increased whiteness.

2. The method of claim 1 wherein the inorganic pigment is a kaolin clay having 2 to 4 meg/100g cation exchange capacity (CEC).

3. The method of claim 1 wherein the combined active concentration of the dyes is 0.00008 to 0.003% by weight of dry pigment.

4. The method of claim 1 wherein the ratio of the (1) blue to the (2) red dye is from 96/4 to 70/30.

5. The method of claim 1 wherein the aqueous slurry of inorganic pigment to which the aqueous solution of dyes is added is at a pH of 6–10.

6. The method of claim 1 wherein the (1) blue dye has the Colour Index designation Basic Blue 77 and (2) the red dye has the Colour Index designation Basic Violet 16.

7. The method of claim 6 wherein the inorganic pigment is a kaolin clay having 2 to 4 meq/100g cation exchange capacity (CEC).

8. The method of claim 7 wherein the combined active concentration of the dyes is 0.00008 to 0.003% by weight of dry pigment.

9. The method of claim 8 wherein the ratio of the (1) blue to the (2) red dye is from 96/4 to 70/30.

10. The method of claim 9 wherein the aqueous slurry of inorganic pigment to which the aqueous solution of dyes is added is at a pH of 6–10.

11. The method of claim 10 which includes the step of spray drying the product.

12. The method of claim 1 wherein the (1) blue dye has the Colour Index designation Basic Blue 54 and (2) the red dye has the Colour Index designation Basic Violet 16.

13. The method of claim 12 wherein the inorganic pigment is a kaolin clay having 2 to 4 meg/100g cation exchange capacity (CEC).

14. The method of claim 13 wherein the combined active concentration of the dyes is 0.00008 to 0.003% by weight of dry pigment.

15. The method of claim 14 wherein the ratio of the (1) blue to the (2) red dye is from 96/4 to 70/30.

16. The method of claim 15 wherein the aqueous slurry of inorganic pigment to which the aqueous solution of dyes is added is at a pH of 6–10.

17. The method of claim 16 which includes the step of spray drying the product.

18. An optically whitened inorganic pigment selected from a mineral clay pigment and a sodium aluminosilicate pigment, said inorganic pigment having undiminished brightness after being treated in an aqueous slurry with an aqueous solution in combination comprising (1) a blue cationic organic dye that is either bright blue or reddish-blue in hue with (2) a red cationic organic dye that is bluish-red in hue, the ratio of the (1) blue to the (2) red dye being from 99/1 to 60/40 at an effective combined concentration of 0.00002 to 0.008% by weight as based on active dyestuffs on dry pigment and vigorously mixing the resulting slurry to bond the dyes directly to the pigment whereby the pigment exhibits increased whiteness.

19. The optically whitened pigment of claim 18 which is a kaolin clay having 2 to 4 meg/100g cation exchange capacity (CEC).

20. The optically whitened pigment of claim 19 wherein the combined active concentration of the dyes in the treating solution is 0.00008 to 0.003% by weight of dry pigment.

21. The optically whitened pigment of claim 20 wherein the ratio of the (1) blue to the (2) red dye in the treating solution is 96/4 to 70/30.

22. The optically whitened pigment of claim 21 wherein the aqueous slurry of inorganic pigment being treated with the aqueous solution of dyes is at a pH of 6–10.

23. The optically whitened pigment of claim 22 which has been spray dried.

24. The optically whitened pigment of claim 22 wherein the aqueous dye treating solution comprises in combination (1) a blue dye having the Colour Index designation Basic Blue 77 and (2) a red dye having the Colour Index designation Basic Violet 16.

25. The optically whitened pigment of claim 22 wherein the aqueous dye treating solution comprises in combination (1) a blue dye having the Colour Index designation Basic Blue 54 and (2) a red dye having the Colour Index designation Basic Violet 16.

26. A composition for whitening an inorganic pigment in combination comprising 1) a blue cationic organic dye selected from the group of dyes having the Colour Index designations Basic Blue 77 and Basic Blue 54 and 2) a red cationic organic dye having the Colour Index designation Basic Violet 16 in a ratio of 1) to 2) of 96/4 to 70/30 as based on both dyes at 100% color strength.

27. A paper coating composition containing therein an effective amount of the optically whitened pigment of claim 18 as a functional coating pigment.

28. The paper coating composition of claim 27 wherein the combined treatment level of dyes in the optically whitened inorganic pigment therein is up to 0.0050% as based on both dyes at 100% color strength.

29. The paper coating composition of claim 28, wherein the combined treatment level of dyes in the optically whitened inorganic pigment therein is up to 0.0025% as based on both dyes at 100% color strength.

30. The paper coating composition of claim 27 wherein the ratio of the (1) blue dye to the (2) red dye is 91/9.

31. A paper coating composition containing therein an effective amount of the optically whitened pigment of claim 25 as a functional coating pigment.

32. The paper coating composition of claim 31 wherein the ratio of the (1) blue dye to the (2) red dye is 91/9.

33. The paper coating composition of claim 32, wherein the combined treatment level of dye in the optically whitened inorganic pigment therein is up to 0.0050% as based on both dyes at 100% color strength.

* * * * *